United States Patent
Gandon

(10) Patent No.: US 6,852,393 B2
(45) Date of Patent: Feb. 8, 2005

(54) TRANSPARENT SUBSTRATE COATED WITH A POLYMER LAYER

(75) Inventor: Christophe Gandon, Saint Jean d'Angely (FR)

(73) Assignee: Saint-Gobain Glass France, Courbevoie (FR)

( * ) Notice: Subject to any disclaimer, the term of this patent is extended or adjusted under 35 U.S.C. 154(b) by 98 days.

(21) Appl. No.: 10/235,908

(22) Filed: Sep. 6, 2002

(65) Prior Publication Data

US 2003/0072932 A1 Apr. 17, 2003

Related U.S. Application Data

(63) Continuation of application No. PCT/FR01/00677, filed on Mar. 7, 2001.

(30) Foreign Application Priority Data

Mar. 8, 2000 (FR) .............................................. 00 02955

(51) Int. Cl.⁷ .......................... B32B 7/02; B32B 18/00; B32B 27/00; B32B 27/42; B32B 17/10
(52) U.S. Cl. .................... 428/195.1; 428/142; 428/147; 428/148; 428/213; 428/325; 428/415; 428/417; 428/421; 428/426; 428/428; 428/432; 428/212; 428/436; 428/442; 428/451; 428/460; 428/463; 427/120; 427/102; 427/99.4; 427/98.9
(58) Field of Search ................................ 428/426, 428, 428/432, 433, 212, 436, 442, 451, 460, 463, 142, 147, 148, 195.1, 213, 325, 415, 416, 421, 444; 427/120, 102, 99.4, 98.9

(56) References Cited

U.S. PATENT DOCUMENTS 4,465,738 A    8/1984  Chang
5,260,055 A   11/1993  Imperante et al.
5,260,095 A   11/1993  Affinito
6,103,363 A * 8/2000  Boire et al. .................. 428/325
6,150,430 A * 11/2000 Walters et al. ................ 522/79

FOREIGN PATENT DOCUMENTS

| CA | 637507 | 6/1962 |
|----|--------|--------|
| EP | 0 226 193 | 6/1987 |
| EP | 0 339 844 | 11/1989 |
| EP | 0 340 935 | 11/1989 |
| EP | 0 733 919 | 9/1996 |
| WO | WO 97/45209 | 12/1997 |

OTHER PUBLICATIONS

Washo, B. D., "Adhesion of Tetrafluorethylene to Substrate", IBM Technical Disclosure Bulletin, vol. 20, No. 12, May 1978, p. 5233 XP002153305,IBM Corp., New York, U.S., ISSN: 0018–8689.

Clark, R.J., "Vapor Primed and Deposited Conformal Coating", IBM Technical Disclosure Bulletin, vol. 20, No. 3, Aug. 1977, pp. 945–946.

Gorham, W.F., "A New General Synthetic Method for the Preparation of Linear Poly–p–xylylenes", Journal of Polymer Science: Part A–1, vol. 4, pp. 3027–3039, 1966.

* cited by examiner

Primary Examiner—Rena Dye
Assistant Examiner—Lawrence Ferguson
(74) Attorney, Agent, or Firm—Oblon, Spivak, McClelland, Maier & Neustadt, P.C.

(57) ABSTRACT

The invention relates to a transparent substrate coated on at least one of its faces with a polymer layer deposited under vacuum. This polymer layer is provided with an adhesion prelayer of organic or organoinorganic nature. The invention also relates to the process for manufacturing such a coated substrate and to its applications.

29 Claims, No Drawings

TRANSPARENT SUBSTRATE COATED WITH A POLYMER LAYER

Continuation of the national stage designation of International Application PCT/FR01/00677 filed Mar. 7, 2001.

TECHNICAL FIELD

The invention relates to transparent substrates, made of organic polymer or more particularly of glass, of silica or of vitroceramic, which are provided with at least one polymer-based layer for conferring a given functional behaviour thereon. It also relates to inorganic substrates, whether transparent or opaque, such as silicon wafers. This type of layer can, for example, be used to mechanically or chemically protect a more unstable underlying coating, to fulfil an optical or interferential role, or to modify the surface properties of the substrate on which it is deposited. Its thickness can in particular vary from a few nanometres to a few microns; it is generally submicronic when it has to act as interferential thin layer.

BACKGROUND OF THE INVENTION

The deposition of this type of layer has formed the subject-matter of various studies. The first route consists of depositing it at atmospheric pressure, the precursor of the layer (monomer, prepolymer) being used in the liquid phase. This choice exhibits a number of disadvantages related to the use of solvents: residual traces of solvent may remain in the layer, the solvent has to be reprocessed/recycled and the thickness of the layer is not very easy to control. Finally, it is not always simple to find the solvent capable of correctly wetting the substrate to be coated.

A second route then consists of depositing the layer under vacuum: the precursor is vaporized and then sprayed under reduced pressure over the substrate. The precursor subsequently polymerizes, either spontaneously or under the effect of a specific treatment, in particular a heat treatment, using infrared radiation, for example, or treatment with ultraviolet radiation or by electron bombardment. This technique exhibits numerous advantages in comparison with the preceding one: no longer solvent to be reprocessed, layers comprising less in the way of impurities. It is generally possible to exert better control over the thickness thereof, very particularly in the range from 10 nm to 1 micrometer. In addition, this technique makes it possible to use starting reactants which are sensitive to water or to oxygen or to use combinations of reactants with a very high reactivity and/or which are difficult to mix homogeneously, which are immiscible or only slightly miscible. In addition, the deposition can be included in an operation for the manufacture of multilayer stacks on the same vacuum deposition line, without interrupting the manufacturing operation. Various embodiments of these techniques are disclosed, in particular, in Patents U.S. Pat. No. 5,260,095, EP-340 935, EP-339 844 and EP-733 919. However, this technique is not without disadvantage either: the polymer layers thus deposited tend to exhibit an inadequate mechanical strength and they tend to become detached, to an increasingly more pronounced extent as their thickness enters the submicronic range and/or when they are based on fluoropolymer or silicone polymer.

An aim of the present invention is consequently to overcome this disadvantage, in particular by improving the quality of the polymer layers deposited under vacuum, in particular with regard to mechanical quality.

SUMMARY OF THE INVENTION

A subject-matter of the invention is a transparent substrate coated on at least one of its faces with a polymer layer deposited under vacuum, the said polymer layer being provided with an organic or organoinorganic adhesion prelayer.

DETAILED DESCRIPTION OF THE INVENTION

Within the meaning of the invention, the adhesion prelayer and the polymer layer are in direct contact with one another. In contrast, there may be an intermediate coating composed of one or more layers between the substrate and the adhesion prelayer.

The said adhesion prelayer is advantageously deposited under vacuum like the polymer layer, in particular by an analogous technique.

Its presence makes it possible to greatly strengthen the interface between the substrate, optionally already provided with a coating, and the polymer layer by exhibiting a two-fold chemical affinity with the two materials in question. To have thus resorted to a prelayer has proved to be very effective in increasing the resistance to detachment of the polymer layer, in particular when the latter has a thickness of less than a micron, for example below 500 nm, that is to say when the tendency towards detachment is at its greatest. This is very important as it is the range of thicknesses from a few nanometres to a few hundred nanometres which is used when the polymer layer has to fulfil an optical role. It is also this type of thickness which is generally chosen when the layer is used in order to modify the surface properties of the substrate (for example to confer thereon a hydrophobic, hydrophilic, defrosting or antifogging nature or a lubricating nature by lowering its coefficient of friction) or as layer for nanoscale lithographic etching, piezo- or pyroelectric layer, or as layer for gas probes.

The invention has thus favoured the combination of two layers with very distinct roles: on the one hand, there is the polymer layer, for which a specific property (for example, a particularly low refractive index if it is to be incorporated in a stack of antireflective layers; a hydrophilic or hydrophobic nature, and the like) is expected. On the other hand, there is its adhesion prelayer, much thinner than the above, the role of which is to provide continuity at a chemical level between two opposing materials (polymer and substrate, which may or may not be already coated) by exhibiting a two-fold chemical affinity with respect to these materials. It is thus possible to modify or adapt the chemical composition of the adhesion prelayer, in particular according to the substrate to be coated, without having to affect the composition of the polymer. It is thus possible to use any type of polymer in so far as it can react with the material of the prelayer, in the way described in detail later. This solution is clearly preferable to that which would have consisted in seeking to chemically modify the polymer layer in order to render it more compatible with its substrate, which is much more complex and which would risk leading to modifications in the properties desired for the polymer layer.

It is very advantageous to deposit the prelayer under vacuum. It is thus possible to deposit the two layers one after the other on the same deposition line and the anchoring of the polymer layer to its adhesion prelayer is thus facilitated.

The substrate is preferably glass, without excluding other inorganic substrates of the vitroceramic, silicon or silica type as mentioned above, or organic polymers of the following types: poly(methyl methacrylate) PMMA, polyethylene terephthalate PET, polyethylene naphthalate PEN, poly(vinyl chloride) PVC, polycarbonates PC, or transparent poly(vinylidene fluoride) derivatives ("Teflon AF", sold by Du Pont de Nemours, or "Cytop", sold by Asahi Glass). The "intermediate" coating mentioned above can comprise one or more inorganic layers of the following types: metal oxide ($SnO_2$, $TiO_2$, $WO_3$, $Nb_2O_5$, ZnO, and the like), metal nitride (TiN, ZrN, and the like), metal (Ag, Al, Ti, steel) or silicon derivatives (silicon oxide, oxynitride, oxycarbide or nitride). Metal carbides or silicon carbides may also be involved.

The thickness of the polymer layer is preferably at least five times, in particular at least ten times, greater than that of the adhesion prelayer.

The fact that the adhesion prelayer is thus chosen to be much finer than the polymer layer can be justified in various ways: this prelayer can really be very fine; it can even be discontinuous. It can furthermore be a monolayer, that is to say a single layer of molecules which are bonded, in particular covalently, to the two materials with which the layer is in contact. As it is very fine, it remains "neutral" at the optical level; it thus does not optically interfere with the role of the polymer layer when the latter is intended to act interferentially on the optics of the substrate and, generally, the appearance of the substrate. As regards the polymer layer, it is from this that a given performance is expected, which can only be achieved with a relatively great thickness.

To give a rough idea, a thickness of the order of 5 nm to 5 μm, in particular 80 nm to 500 nm, is generally chosen for the polymer layer when it has an optical purpose, and of 10 to 200 nm when it instead has the aim of modifying the surface properties of the substrate. A thickness of the order of 0.2 to 10 nm, in particular of 0.5 to 2 nm, is preferably chosen for the adhesion prelayer.

The chemical nature of the polymer layer and the type of precursors capable of constituting it ("precursor" means the monomer and/or prepolymer which are used as starting materials for this layer) are first given in detail without implied limitation.

The polymer layer is preferably chosen from a material obtained from a precursor belonging to at least one of the following families: unsaturated polyester resin, thiol-polyene resin, polyester acrylate, epoxy acrylate, urethane acrylate (it being possible for the acrylate to be replaced by the methacrylate), polysiloxanes, difunctional epoxide polymers, telechelic epoxide polymers, or vinyl ethers.

The polymer chosen can be fluorinated (adjusting the level makes it possible in particular to lower in a controlled way the refractive index of the layer and/or to adjust the degree of hydrophobicity thereof).

This layer is preferably obtained from (optionally fluorinated) precursor(s) having acrylic functional groups which can be crosslinked, in particular by a radical mechanism. The crosslinking can be spontaneous or brought about by radiation of ultraviolet type or electron bombardment or by heat treatment (under or not under vacuum).

The precursor can be monofunctional, such as lauryl acrylate or isodecyl acrylate. It can be difunctional, such as polyethylene glycol diacrylate, 1,6-hexanediol diacrylate, bisphenol A epoxy acrylate, or polysiloxanes with vinyl ends (such as the products sold under the trade name MCR-V41 and DMS-100 by Gelest or under the name Ebercryl 350 by Radcor). It can also relate to siliconetrifluoropropylmethylsiloxane copolymers (such as the product sold under the name FMV-4031 by Gelest). The precursor can also comprise three or more reactive functional groups, such as triacrylates, such as dipentaerythritol pentaacrylate, propoxylated glyceryl triacrylate, or vinylmethoxysiloxane (for example, the product sold under the name VMM-010 by Gelest).

This layer can also be obtained from precursors exhibiting condensation functional groups, in particular the following functional groups: alcohol, amide, amine, acid anhydride, ester, ether, acid halide, nitrile, carbylamine, isocyanate, thiocyanate, peracid, acid, thiol, amino acid, ketone acid, sulphonic acid or epoxide group.

The polymerization/crosslinking by condensation generally requires an annealing stage. Their reactions form polyimides, polyureas, polyamides, polyurethanes or polyesters (which can here again be fluorinated). Examples of precursors are pyromellitic dianhydride, decamethylenediamine, diaminodiphenyl ether, 1,6-diisocyanatohexane, trans-1,4-cyclohexynene diisocyanate, 1,6-hexanediamine, 1,2-diaminocyclohexane, or polydimethylsiloxanes carrying silanol groups (such as the product sold under the trade name DMS-S12 by Gelest), which can additionally be fluorinated (such as the product sold under the name FMS-9921 by Gelest). It can also relate to polymethylsiloxanes carrying aminopropyl groups (such as the product sold under the trade name DMS-All by Gelest) or carrying epoxide functional groups (such as the product sold under the trade name DMS-EO1 by Gelest).

Another type of precursors corresponds to those which it is possible to obtain in situ by the thermal fragmentation of a starting compound to form polymers of the family of the polyarylenes or poly(arylene-vinylene)s (in particular those which are conventionally denoted under the names PPX-N, PPX-C and PPX-D for respectively nonchlorinated, monochlorinated and dichlorinated parylenes) or copolymers of these two types of polymers. This starting compound can be chosen from the following compounds: di-para-xylylene and the derived halogenated compounds, 4-trifluoroacetyl[2.2]paracyclophane, 4-amino[2.2] paracyclophane, α-dialoxylene-para-xylenes, including α,α-dichloro-para-xylene (DCPX).

As mentioned above, the composition of these polymers, in particular their possible level of fluorinated functional groups, makes it possible to adjust certain properties of the layer, in particular its refractive index, which can, for example, be between 1.75 and 1.29, in particular between 1.42 and 1.30. Its hydrophobicity can also be adjusted so as to exhibit a contact angle with water of greater than 90°, in particular of greater than 105°.

The chemical nature of the adhesion prelayer and the type of compounds from which it is preferably composed are now given in detail without implied limitation.

It is, for example, made essentially from a single type (or from several types) of molecules/compounds, at least one of which exhibits at least one "B" group which is reactive with the precursors of the polymer layer and at least one "A" group which is reactive with the material on which it is deposited, in particular glass or a coating made of metal oxide, of the $SnO_2$ type, or made of metal nitride, metal carbide, silicon nitride, silicon carbide or silicon derivative. Use is also made of difunctional molecules which will be able to create a true bridge between the two materials with the creation of firm bonds with the latter. Advantageously, covalent bonds are thus created between the polymer layer and its prelayer and covalent bonds or a binder are thus created between the prelayer and the material on which it is deposited.

The reactive group A is preferably in the form $Me(OR)_{3-m} Cl_m$, with $m \geq 1$ and preferably $m=3$. It can also be in the form $-MeCl_4$. The metal Me can, for example, be Si, Ti, Sn or Ge and is chosen according to the material underlying the prelayer. If it is glass, silicon oxycarbide or silicon oxynitride, Me is for example chosen to be Si; thus, this reactive group can interact with the Si—OH groups of the glass or of the silicon oxide. Similarly, Me is chosen to be Sn or Si if the prelayer is deposited on a layer based on a tin derivative of the tin oxide type. There then takes place formation of Si—O—Si or Si—O—Sn or Sn—O—Sn covalent bonds, providing good anchoring of the prelayer.

The reactive group B can comprise the following functional groups: alkene (family of the acrylates, of the methacrylates and the like), alkyne (family of the acetylenics), alcohol, aldehyde, amide, amine, acid anhydride, ketone, ester, ether, acid halide, nitrile, carbylamine, isocyanate, thiocyanate, peracid, acid, thiol, amino acid, ketone acid and sulphonic acid functional groups or epoxide or azo groups.

Examples of these bifunctional compounds (in particular bifunctional silanes) are listed below without a limiting nature: allyltrichlorosilane, allylhexyldichlorosilane, methacryloyloxypropyltrichlorosilane, 3-isocyanatopropyldimethylchlorosilane, hexadichlorosilane, divinyldichlorosilane, 2-cyanoethyltrichlorosilane, 3-acryloyloxypropyltrichlorosilane, acetoxypropylmethyldichlorosilane, allyltrichlorogermane, 3-(trichlorogermyl)propionyl chloride or bis(carbomethoxyethyl)dichlorotin.

Of course, the nature of the reactive groups of B type must be chosen according to that of the precursors of the polymer layer.

With the type of organic compound/molecule mentioned above, the adhesion prelayer according to the invention can form covalent bonds both with the material which underlies it and with the material of the polymer layer.

According to a specific alternative form of the invention, the polymer layer forms part of a stack of thin layers, with at least one inorganic layer of the metal oxide or silicon derivative type (or another type of layer of the polymer layer type) above it. In this case, provision may be made for the insertion, between the polymer layer and the possible upper (inorganic) layer, of a fine organic or organoinorganic adhesion overlayer. This overlayer can be entirely similar in its function, its chemical nature and its thickness to the prelayer described above.

The prelayer/polymer layer/overlayer/possible additional layer(s) combination may have numerous applications, besides the stacks combining polymer layers and inorganic layers of the oxide type.

The polymer layer combined with its adhesion prelayer may have highly varied applications: it can act as mechanical or chemical protective layer, barrier layer to gases or to liquids with respect to the carrier substrate or an underlying coating, or even protective layer with regard to ultraviolet radiation. It can thus act as encapsulation coating for a layer or for a stack of layers with an optical, thermal, electrical (pyroelectric or piezoelectric) or electrochemical function, such as an electrochromic, electroluminescent or liquid crystal system, or for a layer for nanoscale lithographic etching or a layer for gas probes.

The polymer layer can form an integral part of a coating/stack of layers with a solar-protection, low-emissivity, antireflective, decorative, electrical or electrochemical function. It can thus, in the case of a solar-protection or low-emissivity coating using a functional layer at least made of silver, of metal nitride of TiN or ZrN type or of doped metal oxide of the $F:SnO_2$ type, act as dielectric material with an optical role which in particular weakens the light reflection induced by this functional layer. In an antireflective stack in which layers of high refractive index alternate with layers of low refractive index, it can act as the layer of low index, in particular when it is fluorinated.

In an electrical or electrochemical system, it can act as electrical insulation layer. On the other hand, it can be chosen to be electrically conductive and can make possible electrical continuity in these systems.

The polymer layer can also by itself have a functional role: it can, with its prelayer, constitute a hydrophobic coating with a rain-repellent or antifogging effect, in particular if the polymer is fluorinated. It can also be chosen to be hydrophilic with an antifogging effect. It can be also be chosen so as to be defrosting, oleophilic or lubricating. It can also be chosen to be oleophobic.

It can have a decorative function, alone or in combination with other layers, in particular by creating coloured iridescences by an appropriate choice of its thickness and of its refractive index.

It can also act as host layer for dyes, colourings, molecules with nonlinear optical behaviour, with liquid crystals or with fluorinated molecules.

Advantageously, the polymer layer and its prelayer (and optionally its overlayer) are transparent, with a very low light absorption, indeed even a virtually zero light absorption. As mentioned above, the prelayer is preferably so thin that its optical role is negligible.

Another subject-matter of the invention is the process for the manufacture of the coated substrate described above, which consists in particular in depositing the adhesion prelayer and the polymer layer consecutively on the same manufacturing line under vacuum.

When these layers are combined with other inorganic layers, it is thus highly advantageous for all the layers to be able to be deposited successively on the same deposition line. Of course, the layers of the invention can also be combined with other polymer layers, which can be deposited under vacuum like the layers of the invention.

The inorganic layers which are positioned under the prelayer and the polymer layer according to the invention can be deposited under vacuum or not under vacuum, in particular by pyrolysis, CVD or sol-gel, for deposition operations at atmospheric pressure, and by plasma CVD, ion sputtering, evaporation, vapour deposition or cathode sputtering, optionally magnetic-field-enhanced cathode sputtering, for deposition operations under vacuum. The same type of technique can be used for possible inorganic layers above the polymer layer. However, it is preferable to avoid cathode sputtering and plasma CVD as there is a risk that they will cause damage to the adhesion overlayer according to the invention, when it used.

The process for the manufacture of the prelayer and the polymer layer advantageously comprises the following stages:

a)—injection in vapour form of the compound(s)/molecule(s) used to form the prelayer on the substrate, resulting in particular in an at least partial reaction of the said compound with the material over which it has been sprayed (the spraying in vapour form may have to be preceded by a stage of vaporizing the compound which is solid/liquid under standard pressure conditions), b)—injection in vapour form of the precursors of the polymer layer over the said substrate and thus above the compounds of the prelayer (here again, the spraying may have to be preceded by a stage of vaporizing the precursors).

c)—polymerization/crosslinking of the precursors and at least partial reaction of the said precursors of the polymer layer with the compounds of the prelayer at their interface.

This two-fold reaction can be spontaneous, carried out under vacuum or at atmospheric pressure. It can be brought about or accelerated by radiation of the ultraviolet type, by electron bombardment or simple heat treatment of the infrared radiation type.

What is advantageous about this process is that the depositions of the starting materials can be consecutive, without requiring a specific intermediate treatment between the two spraying operations (even if such a treatment may optionally be resorted to).

Another subject-matter of the invention is the application of the substrate described above for manufacturing glazing assemblies for buildings or vehicles, in particular monolithic glazing assemblies (a single rigid substrate), laminated glazing assemblies or multiple glazing assemblies. The vehicles can be ground vehicles (cars, trains), ships or aircraft. They can also be used for manufacturing any type of display screen, display panel or street furniture. The substrate can also be opacified and can be used as a mirror or facade facing panel which has been reduced in weight.

The invention will be described in more detail below using nonlimiting examples.

All the adhesion prelayers and the polymer layers of the examples are deposited under vacuum, by vaporization of the deposition compounds, successive injections over the substrate in a chamber under reduced pressure (for example at the most 50 torr) and then an optional treatment intended to promote the polymerization of the polymer layer and "the attaching" of the prelayer to the latter. The substrates are substrates made of clear silica-soda-lime glass of the Planilux type (glass sold by Saint-Gobain Vitrage).

EXAMPLE 1

The aim of this example is the preparation of a permanent protective layer for a relatively unstable inorganic layer, in particular unstable with respect to oxidation or resistance to water.

The deposition device is in accordance with that disclosed in the publication by W. F. Gorham: J. Polym. Sci., 4, 3027 (1966) and in Patent CA 637 507.

There is a mirror made of the glass substrate provided with an aluminium layer deposited by magnetic-field-enhanced cathode sputtering using an aluminium target. The Al layer has a thickness of 50 nm.

An adhesion prelayer is deposited on the aluminium layer according to the invention in the following way: 5 µl of vaporized acetoxypropylmethyldichlorosilane are sprayed over the substrate, already provided with the Al layer, in a chamber under a pressure of 0.1 torr at a temperature of 200° C.

The polymer layer is deposited consecutively in the following way: 0.5 g of dichloro-di-p-xylene is sublimed at 120° C. under a pressure of 1 torr. The vapour formed is subsequently subjected to thermal fragmentation at 650° C. under a pressure of 0.5 torr. The fragmentation products polymerize spontaneously over the substrate at 25° C. under a pressure of 0.1 torr.

It is pointless to subsequently carry out a post-treatment: the reactions between the precursor of the prelayer and the substrate, and the prelayer and the polymer layer and the polymerization/crosslinking of the latter take place spontaneously at 25° C. without an external energy contribution.

The polymer layer obtained is made of poly(para-xylylene) (PPX-C). It has a thickness of 500 nm. The prelayer has a thickness of approximately 3 nm (thickness determined by X-ray diffraction on a sample not covered with the polymer layer).

This stack is subjected to the NSS (neutral salt spray) test, the protocol of which is as follows: the layers are subjected to an aqueous spray comprising 50 g/l of NaCl with a pH of 7 and a temperature of 35° C. The test is finished when points of corrosion are visible to the naked eye on the aluminium layer.

The result of this test is as follows: flaws appear after 10 days, whereas flaws appear after only 5 days in the absence of the polymer layer and its prelayer.

Another test was carried out in which the substrate coated according to the invention was compared with the substrate prepared by way of comparison without prelayer: without prelayer, the PPX-C layer completely detaches when it is immersed in a THF or xylene solvent bath or in refluxing water or in a chlorinated aromatic solvent, this taking place in less than 15 minutes. In contrast, with its prelayer, the PPX-C layer remains firmly adherent to the glass after 24 hours in each of these solvents.

It is concluded therefrom that, by virtue of the adhesion prelayer, the PPX polymer layer adheres extremely well to the glass substrate, although PPX is nonpolar and nonionic. Without prelayer, in contrast, a phenomenon of local detachment of the polymer layer occurs. The layer of the invention, combined with its prelayer, can thus efficiently fulfil its role of lasting protection with respect to underlying layers.

The invention thus makes possible the use of polymers of PPX type for protecting glass items as such, without having to chemically modify them.

The PPX layer is transparent. The light transmission thereof can be reduced by adding the appropriate dyes, for example to decrease a possible "two-way mirror" effect.

EXAMPLE 2

The aim of this example is the preparation of a layer according to the invention, the function of which may, for example, be mechanical protection against splinters or shards during phases of cutting the glass or against abrasion during its transportation.

The deposition operations are carried out directly on the glass. The deposition device is, for example, disclosed in the abovementioned Patent U.S. Pat. No. 5,260,055.

The adhesion prelayer is deposited from 10 µl of 3-acryloyloxypropyltrichlorosilane, heated beforehand to 60° C. under 0.4 torr, in a chamber in which the glass to be coated is present and which is at a pressure of 0.05 torr.

The polymer layer is deposited consecutively in the same chamber from 0.1 ml of CN 132 (CN 131) from Cray Valley (an oligomer of the family of the aliphatic diacrylates) to which 0.5% by weight of Irgacure 1850 resin from Ciba has been added, the oxygen present therein having been removed from the mixture and the mixture having been preheated to 350° C. Irgacure is a trade name encompassing photoinitiators for radical polymerization from Ciba. Mention may be made, among these, of bis(2,6-dimethoxybenzoyl) (2,4,4,-trimethylpentyl) phosphine oxide or 1-hydroxycyclohexyl phenyl ketone. Irgacure 1850 is a 50/50 mixture of these two compounds. (Mention may also be made of bis(2,4,6-trimethylbenzoyl) phenylphosphine oxide, which is Irgacure 819, and benzophenone, the combination of which with the preceding compound is sold under the name Irgacure 500.)

A post-treatment is subsequently carried out, which post-treatment consists in maintaining the substrate in the chamber under vacuum and in subjecting it to radiation from a mercury vapour ultraviolet lamp.

The substrate thus coated is subsequently subjected to a mechanical abrasion test known as the OPEL test: It consists in applying a load of 16.7 N to a wool pad which is driven with a to- and fro-movement at the surface of the substrate. The resistance to scratching of the layer is evaluated as a function of the fuzziness of the latter after the test. The fuzziness increases as the number of scratches increases, the extreme case being detachment of the layer. The to- and fro-number corresponds to the number of "OPEL cycles."

For a prelayer thickness of approximately 1 nm and a polymer layer thickness of 500 nm and 760 nm respectively, the results in the OPEL test are combined in Table 1 below: (fuzziness expressed in %, without a unit)

TABLE 1

| OPEL TEST | Example 2 500 nm polymer layer | Example 2 760 nm polymer layer |
|---|---|---|
| 0 cycle | 0.30 | 0.10 |
| 200 cycles | 0.35 | 0.25 |
| 400 cycles | 0.35 | 0.30 |
| 600 cycles | 0.35 | 0.45 |
| 800 cycles | 0.50 | 0.45 |
| 1000 cycles | 0.70 | 0.60 |

By way of comparison, Comparative Examples 2 were carried out with the same polymer layer but without prelayer. The results in the Opel test are shown in Table 2 below:

TABLE 2

| OPEL TEST | Comparative Example 2 500 nm polymer layer | Comparative Example 2 760 nm polymer layer |
|---|---|---|
| 0 cycle | 0.10 | 0.10 |
| 200 cycles | 0.85 | 0.90 |
| 400 cycles | detachment | 2.20 |
| 600 cycles | detachment | 2.25 |
| 800 cycles | detachment | 2.10 |
| 1000 cycles | detachment | 2.15 |

It is seen, from these two tables, that the presence of the prelayer has a very beneficial effect on the resistance to detachment of the polymer layer: in its absence, the polymer layers with a thickness of 500 nm (and less) are not as resistant. The prelayer makes it possible to lower the minimum thickness of the polymer layer beyond which detachment no longer occurs.

EXAMPLE 3

The aim of this example is the preparation of a hydrophobic and mechanically durable layer over a window assembly provided with a solar-protection coating in the form of a layer of tin oxide doped with fluorine ($F:SnO_2$) with a thickness of 100 nm, which layer is deposited by vapour phase pyrolysis (CVD) in a known way:

the deposition operations are carried out with the same deposition device and in the same way as in Example 2 but this time over the $F:SnO_2$ layer, the adhesion prelayer is deposited by spraying 10 μl of 3-(trichlorogermyl)propionyl chloride heated beforehand to 60° C. under 0.4 torr, the polymer layer is deposited consecutively from 0.05 ml [lacuna] 0.5% by weight of Irgacure 1850 resin from Ciba, which is a photoinitiator added to the resin to make possible initiation of the polymerization by U.V. radiation, the same post-treatment is carried out as in Example 2, a prelayer with a thickness of 0.7 nm (determined by X-ray diffraction on a sample devoid of polymer layer) and a polymer layer with a thickness of 360 nm are obtained.

The results in the Opel test described above are as follows:

the contact angle with water is 95° and remains greater than 70° after the coated substrate has been subjected to the Opel test for 800 cycles, if the experiment is repeated without the prelayer, the initial contact angle with water is still 95°. On the other hand, after 800 cycles by the Opel test, the contact angle with water falls to a value of less than 35°, which shows indirectly that the polymer layer has been destroyed/detached.

In conclusion, the invention has developed a simple and effective solution to the problem of inadequate adhesion of polymers as thin layers to glass using a process under vacuum. The invention has made it possible to significantly increase the resistance to abrasion of polymers as a thin layer, below a micrometre. This opens the route to a much more extensive use of this type of material, in particular as protective layer and/or interferential layer with an optical role on substrates of glass type and all the abovementioned applications.

I claim:

1. A substrate comprising a surface that is coated with an adhesion prelayer and an overlying polymer layer; the adhesion prelayer being comprised of molecules/compounds, at least one of which has at least one B group which is reactive with the precursors of the polymer layer and at least one A group which is reactive with the material on which it is deposited, said reactive group A being in the form of: $Me(OR)_{3-m}Cl_m$, wherein $m \geq 1$, Me is Si, Ti, Sn or Ge or $MeCl_4$ and said reactive group B being compounds containing an olefinically unsaturated bond, alkyne, alcohol, aldehyde, amide, amine, acid anhydride, ketone, ester, ether, acid halide, nitrile, carbylamine, isocyanate, thiocyanate, peracid, acid, thiol, amino acid, ketone acid, sulfonic acid, epoxide or azo, with the adhesion prelayer being in direct contact with the polymer layer.

2. The substrate of claim 1, wherein the adhesion prelayer is in direct contact with the surface.

3. The substrate of claim 1, further comprising one or more intermediate coating layers between the adhesion prelayer and the surface.

4. The substrate of claim 1, wherein the substrate comprises glass, silica, silicon, a vitroceramic polymer, an organic polymer, and mixtures thereof.

5. The substrate of claim 3, wherein the one or more intermediate coating layers is selected from the group consisting of a metal oxide, metal nitride, metal, silicon oxide, silicon oxynitride, silicon oxycarbide, silicon nitride, and mixtures thereof.

6. The substrate of claim 1, wherein the thickness of the polymer layer is at least 5 times greater than the thickness of the adhesion layer.

7. The substrate of claim 1, wherein the polymer layer has a thickness ranging from about 5 nm to 5 mm.

8. The substrate of claim 1, wherein the adhesion prelayer has a thickness ranging from about 0.2 nm to 10 mm.

9. The substrate of claim 1, wherein the adhesion prelayer is discontinuous.

10. The substrate of claim 1, wherein the polymer layer is prepared by polymerizing one or more polymer precursors selected from the group consisting of unsaturated polyester resins, thiol-polyene resins, polyester acrylates, epoxy acrylates, urethane acrylates, polysiloxanes, difunctional epoxide polymers, telechelic epoxide polymers, vinyl ethers, and mixtures thereof.

11. The substrate of claim 2, wherein the polymer layer is prepared by polymerizing one or more polymer precursors selected from the group consisting of unsaturated polyester resins, thiol-polyene resins, polyester acrylates, epoxy acrylates, urethane acrylates, polysiloxanes, difunctional epoxide polymers, telechelic epoxide polymers, vinyl ethers, and mixtures thereof.

12. The substrate of claim 1, wherein the polymer layer is prepared by polymerizing one or more polymer precursors having an acrylic functional group.

13. The substrate of claim 10, wherein the polymer precursors are selected from the group consisting of lauryl acrylate, isodecyl acrylate, polyethylene glycol acrylate, 1,6-hexanediol diacrylate, bisphenol A epoxy acrylate, polysiloxanes with vinyl terminal groups, siliconetrifluoropropylmethylsiloxane copolymers, triacrylates, dipentaerythritol pentaacrylate, propoxylated glyceryl triacrylate, vinylmethoxysiloxane and mixtures thereof.

14. The substrate of claim 1, wherein the polymer layer is fluorinated.

15. The substrate of claim 1, wherein the polymer layer is prepared by polymerizing one or more polymer precursors having a condensation functional group selected from the group consisting of alcohols, amides, amines, acid anhydrides, esters, ethers, acid halides, nitriles, carbylamines, isocyanates, thiocyanates, peracids, acids, thiols, amino acids, ketone acids, sulphonic acids, epoxides, and mixtures thereof.

16. The substrate of claim 15, wherein the polymer precursors are selected from the group consisting of pyromellitic dianhydride, decamethylenediamine, diaminodiphenyl ether, 1,6-diisocyanatohexane, trans-1,4-cyclohexynene diisocyanate, 1,6-hexanediamine, 1,2-diaminocyclohexane, polydimethylsiloxanes, polymethylsiloxanes, and mixtures thereof.

17. The substrate of claim 14, wherein the polymer layer has a refractive index ranging from about 1.75 to 1.29.

18. The substrate of claim 14, wherein the polymer layer has a contact angle with water of greater than 90°.

19. The substrate of claim 3, wherein the adhesion prelayer comprises a first functional group that can react with the one or more polymer precursors and a second functional group that can react with the intermediate coating.

20. The substrate of claim 14, wherein the adhesion prelayer forms covalent bonds with the substrate.

21. The substrate of claim 3, wherein the adhesion prelayer forms covalent bonds with the intermediate coating.

22. The substrate of claim 1, wherein the adhesion prelayer forms covalent bonds with the polymer layer.

23. The substrate of claim 3, wherein the adhesion prelayer forms covalent bonds with the polymer layer.

24. The substrate of claim 1, further comprising an inorganic layer in contact with the polymer layer.

25. The substrate of claim 1, wherein the adhesion prelayer and the polymer layer are substantially transparent.

26. The substrate of claim 1, wherein the polymer layer is selected from the group consisting of polyimides, polyureas, polyamides, polyurethanes, polyesters, and mixtures thereof.

27. The substrate of claim 3, wherein the one or more intermediate coatings comprises an inorganic layer.

28. A process for manufacturing the substrate of claim 1 comprising:
providing the substrate;
coating the substrate with one or more precursors to the adhesion prelayer, wherein the one or more precursors to the adhesion prelayer react with the substrate;
coating the one or more precursors to the adhesion prelayer with one or more polymer precursors;
polymerizing or crosslinking the one or more polymer precursors; and
reacting the one or more polymer precursors with the one or more precursors to the adhesion prelayer.

29. The process of claim 1, wherein the one or more polymer precursors have an acrylic functional group that is crosslinked by, ultraviolet radiation, electron bombardment, or a heat treatment.

* * * * *